US012716811B2

(12) United States Patent
Brouqui et al.

(10) Patent No.: US 12,716,811 B2
(45) Date of Patent: Aug. 25, 2026

(54) METHOD FOR DETECTING MALFUNCTIONING OF A FUEL RETURN VALVE IN AN AIRCRAFT

(71) Applicant: Airbus Operations SAS, Toulouse (FR)

(72) Inventors: Manon Brouqui, Toulouse (FR); Matthieu Bradier, Toulouse (FR); Eric Benhamou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 380 days.

(21) Appl. No.: 18/469,259

(22) Filed: Sep. 18, 2023

(65) Prior Publication Data

US 2024/0094088 A1 Mar. 21, 2024

(30) Foreign Application Priority Data

Sep. 19, 2022 (FR) ...................................... 2209445

(51) Int. Cl.
*G01M 13/003* (2019.01)
*F02C 7/232* (2006.01)
(Continued)

(52) U.S. Cl.
CPC ........... *G01M 13/003* (2019.01); *F02C 7/232* (2013.01); *F02C 9/36* (2013.01); *G01K 1/026* (2013.01);
(Continued)

(58) Field of Classification Search
CPC ......... G01M 13/003; F02C 7/232; F02C 9/36; F02C 7/06; F02C 7/14; G01K 1/026;
(Continued)

(56) References Cited

U.S. PATENT DOCUMENTS 5,241,814 A * 9/1993 Butler ........................ F02C 7/14 60/39.08
8,601,792 B2 * 12/2013 Mylemans ................ F02C 7/06 165/44
(Continued)

FOREIGN PATENT DOCUMENTS

FR 2999653 A1 6/2014

OTHER PUBLICATIONS

French Search Report for corresponding French Patent Application No. 2209445 dated Apr. 12, 2023; priority document.

*Primary Examiner* — Laura Martin
*Assistant Examiner* — Philip L Cotey
(74) *Attorney, Agent, or Firm* — Greer, Burns & Crain, Ltd.

(57) ABSTRACT

In an aircraft, a fuel return valve (FRV) controls a flow of fuel, used to cool an oil feeding a propulsion engine and an oil of an integrated drive generator (IDG). A first sensor supplies measurements of the oil temperature at an output port of the IDG and a second sensor supplies measurements of oil temperature of the propulsion engine. An FRV operation monitoring system: determines, for each flight of the aircraft, an oil temperature maximum at an output port of the IDG and/or a maximum oil temperature of the propulsion engine; assesses a trend of one and/or the other of the oil temperature maxima over several flights; and generates an alarm when the trend of one and/or the other of the oil temperature maxima shows that a predetermined threshold has been exceeded.

11 Claims, 2 Drawing Sheets

(51) Int. Cl.

| | |
|---|---|
| ***F02C 9/36*** | (2006.01) |
| ***G01K 1/02*** | (2021.01) |
| ***G01K 3/00*** | (2006.01) |
| ***G01K 13/02*** | (2021.01) |
| ***G05B 23/02*** | (2006.01) |
| *F02C 7/06* | (2006.01) |
| *F02C 7/14* | (2006.01) |

(52) U.S. Cl.
CPC .......... *G01K 3/005* (2013.01); *G01K 13/026* (2021.01); *G05B 23/0235* (2013.01); *G05B 23/0283* (2013.01); *F02C 7/06* (2013.01); *F02C 7/14* (2013.01); *F05D 2220/76* (2013.01); *F05D 2260/80* (2013.01); *F05D 2270/3032* (2013.01)

(58) Field of Classification Search
CPC .. G01K 3/005; G01K 13/026; G05B 23/0235; G05B 23/0283; F05D 2220/76; F05D 2260/80; F05D 2270/3032
See application file for complete search history.

(56) References Cited

U.S. PATENT DOCUMENTS

| | | | | |
|---|---|---|---|---|
| 9,650,960 | B2 * | 5/2017 | Vertenoeuil | F02C 9/263 |
| 2007/0260374 | A1 * | 11/2007 | Morrison | F02D 41/22 701/99 |
| 2013/0066487 | A1 * | 3/2013 | Holder | G08G 5/21 701/14 |
| 2013/0086909 | A1 * | 4/2013 | Wang | F02C 9/36 60/730 |
| 2014/0014198 | A1 * | 1/2014 | de Wergifosse | F02C 7/06 137/340 |
| 2016/0177845 | A1 * | 6/2016 | Dyrla | B64D 37/30 137/340 |
| 2016/0178471 | A1 * | 6/2016 | Blumrich | G01M 3/025 73/49.7 |
| 2016/0265438 | A1 * | 9/2016 | Keeler | F02C 7/14 |
| 2019/0170016 | A1 * | 6/2019 | Stearns | F01D 25/20 |
| 2021/0380270 | A1 * | 12/2021 | Nakashima | H02P 9/04 |
| 2021/0388736 | A1 * | 12/2021 | Adhiachari | F02C 7/06 |
| 2022/0003173 | A1 * | 1/2022 | Joudareff | F02C 7/232 |
| 2022/0090515 | A1 * | 3/2022 | Beecroft | F02C 9/00 |

* cited by examiner

METHOD FOR DETECTING MALFUNCTIONING OF A FUEL RETURN VALVE IN AN AIRCRAFT

CROSS-REFERENCES TO RELATED APPLICATIONS

This application claims the benefit of French Patent Application No. 2209445 filed on Sep. 19, 2022, the entire disclosure of which is incorporated herein by way of reference.

TECHNICAL FIELD

The present invention relates to the field of the monitoring and of the detection of malfunctioning of a "fuel return valve" FRV in an aircraft.

STATE OF THE ART

In an aircraft, an "integrated drive generator" IDG is a system associated with each propulsion engine (jet engine) in order to convert the kinetic energy of said propulsion engine into electrical energy to supply electricity to the aircraft. The IDG potentially provides an electrical power supply to all the electrical loads of the aircraft.

The IDG is composed of an alternator and of a "constant speed drive" CSD that are mounted in one and the same housing. The CSD is a mechanical device that makes it possible to obtain a constant rotation frequency at the input of the alternator despite the variations of rotation speed of the propulsion engine. Thus, the IDG can deliver a fixed frequency (for example, 400 Hz) to the electrical network of the aircraft.

Oil is a vital component of the IDG, and the appropriateness of the temperature of this oil with the specifications is an essential parameter for the longevity and the efficiency of the IDG. The oil used for the cooling of the IDG circulates in a closed circuit and is cooled, by an "oil cooler", using the fuel feeding the propulsion engine with which the IDG is associated. Likewise, a "heat exchanger" is used to cool the oil used for the lubrication of the propulsion engine itself. The heat exchanges allowing the cooling of these oils depend therefore on the flow of fuel feeding the propulsion engine concerned.

Now, since, during certain flight phases, and more particularly in the descent phase, the fuel need of the propulsion engine is lesser, the fuel feeding the propulsion engine may not be sufficient for the cooling of these oils, which reduces the longevity and the performance of the IDG.

To take account of this aspect, a "fuel return valve" FRV is used, so as to increase the flow of fuel to maintain the cooling of the oil used for the cooling of the IDG and of the oil used for lubrication of the propulsion engine. The FRV controls the flow of fuel from a system for distributing fuel to the propulsion engine to a recirculation system returning the hot fuel to the fuel tank of the aircraft. When the FRV is in closed position, the recirculation system is disabled.

It emerges from the above that, when the FRV experiences a malfunction, whether it be due to a failure of the FRV itself or to a failure of another member with which the FRV interacts, directly or indirectly, such as a sensor or a "fuel level sensing control unit" FLSCU, the longevity and the performance of the IDG may be lessened. For example, a sensor failure can lead to an undesirable closure of the FRV which will result in an undesirable rise in temperature of the oil used to cool the IDG.

It is then desirable to mitigate these drawbacks of the state of the art. It is notably desirable to provide a solution which makes it possible to detect a malfunction experienced by the FRV that can impact the cooling of the IDG. It is, moreover, desirable to provide a solution which is simple and inexpensive.

SUMMARY OF THE INVENTION

To this end, a method is proposed for monitoring a fuel return valve, called FRV, controlling a flow of fuel, used to cool an oil feeding a propulsion engine of an aircraft and an oil of an integrated drive generator, called IDG, from a system for distributing fuel to the propulsion engine to a recirculation system returning hot fuel to a fuel tank of the aircraft in order to make it possible to inject, into the fuel distribution system, colder fuel originating from said fuel tank of the aircraft, a first oil temperature sensor supplying oil temperature measurements at an output port of the IDG, a second oil temperature sensor supplying measurements of the temperature of oil feeding the propulsion engine, the method being implemented by an FRV operation monitoring system in the form of electronic circuitry, the method being characterized in that it comprises the following steps: determining, for each flight of the aircraft, an oil temperature maximum at the output port of the IDG according to the measurements of said first oil temperature sensor and/or an oil temperature maximum of the propulsion engine according to the measurements of said second oil temperature sensor; assessing a trend of one and/or the other of the oil temperature maxima over several flights; and generating an alarm when the trend of one and/or the other of the oil temperature maxima shows that a predetermined oil temperature threshold T has been exceeded.

Thus, a malfunction experienced by the FRV that can impact the cooling of the IDG is easily detected. The maintenance associated with the FRV is facilitated.

In a particular embodiment, the alarm is generated when the trend of one and/or the other of the oil temperature maxima shows that said predetermined threshold T has been exceeded during Y flights of a sliding window of Z consecutive flights, with Y and Z predetermined values such that $Y<Z$.

In a particular embodiment, only the measurements performed during the cruising flight phases of the aircraft are taken into account.

In a particular embodiment, only the measurements performed during flights of the aircraft of a duration greater than a predefined duration threshold D are taken into account.

In a particular embodiment, to monitor several FRVs respectively associated with several propulsion engines of the aircraft, the FRV operation monitoring system is distributed in control units respectively associated with the propulsion engines of the aircraft.

In a particular embodiment, the FRV operation monitoring system is centralized in the avionics of the aircraft.

Also proposed is a computer program product, which can be stored on a medium and/or downloaded from a communication network, in order to be read by a processor. This computer program comprises instructions for implementing the abovementioned method in any one of its embodiments, when said program is run by the processor. Also proposed is a non-transient information storage medium on which such a computer program is stored.

Also proposed is a system for monitoring operation of a fuel return valve, called FRV, the FRV controlling a flow of fuel, used to cool an oil feeding a propulsion engine of the aircraft and an oil of an integrated drive generator, called IDG from a system for distributing fuel to the propulsion engine to a recirculation system returning hot fuel to a fuel tank of the aircraft in order to make it possible to inject, into the fuel distribution system, colder fuel originating from said fuel tank of the aircraft, a first oil temperature sensor supplying oil temperature measurements at an output port of the IDG, a second oil temperature sensor supplying measurements of the temperature of oil feeding the propulsion engine, the FRV operation monitoring system being in the form of electronic circuitry, characterized in that it is configured to implement the following steps: determining, for each flight of the aircraft, an oil temperature maximum at the output port of the IDG according to the measurements of said first oil temperature sensor and/or an oil temperature maximum of the propulsion engine according to the measurements of said second oil temperature sensor; assessing a trend of one and/or the other of the oil temperature maxima over several flights; and generating an alarm when the trend of one and/or the other of the oil temperature maxima shows that a predetermined oil temperature threshold T has been exceeded.

Also proposed is an aircraft comprising at least one system for monitoring operation of a fuel return valve, called FRV, as set out above.

BRIEF DESCRIPTION OF THE DRAWINGS

The abovementioned features of the invention, and others, will emerge more clearly on reading the following description of at least one exemplary embodiment, said description being given in relation to the attached drawings, among which.

DETAILED EXPLANATION OF EMBODIMENTS

Figure 1:
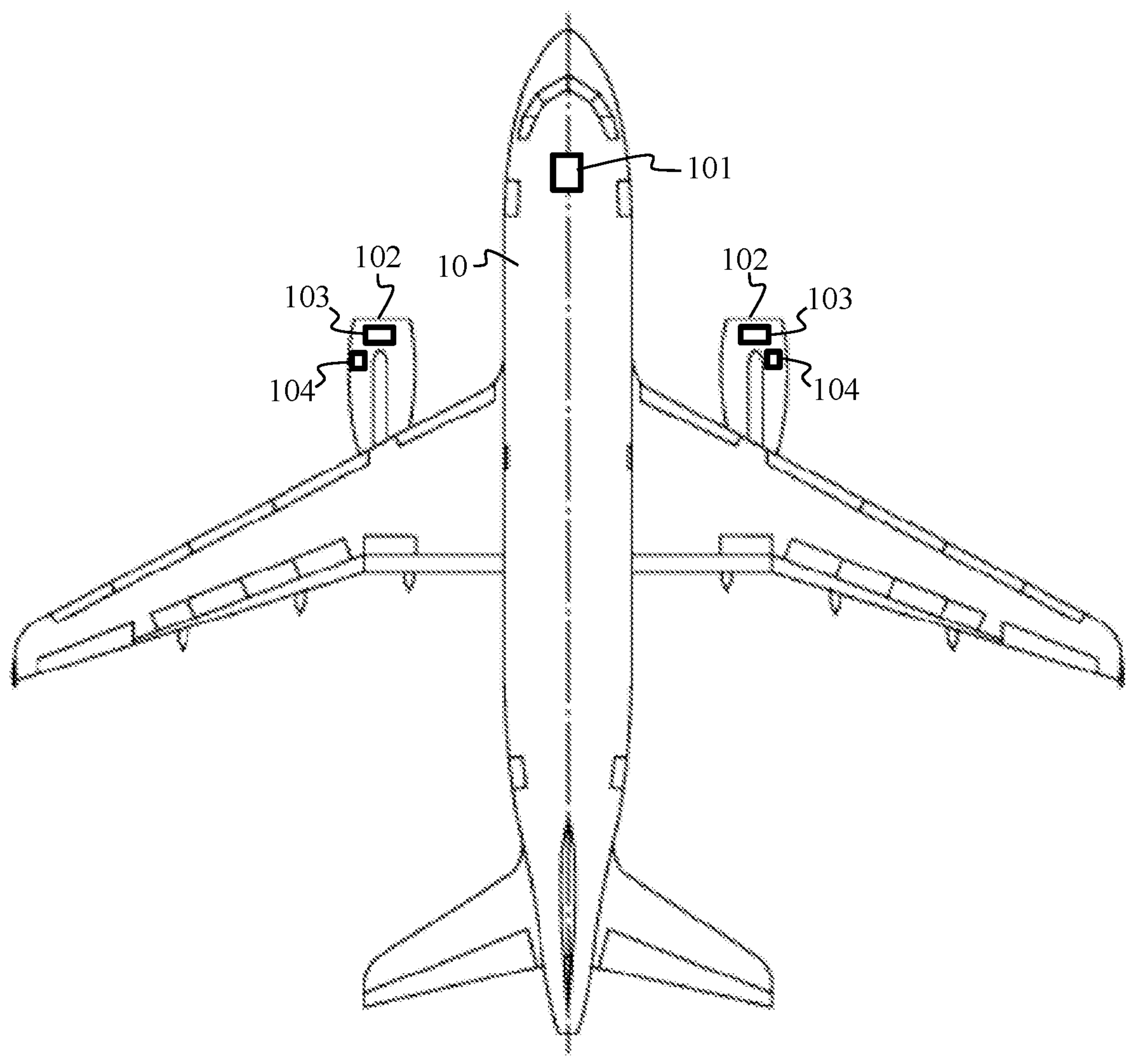
FIG. 1 schematically illustrates, in a top view, an aircraft equipped with propulsion engines respectively provided with integrated drive generators IDG.

FIG. 1 schematically illustrates, in a top view, an aircraft 10. The aircraft 10 comprises at least one propulsion engine 102, preferentially of jet engine type. Each propulsion engine 102 is provided with an integrated drive generator IDG 103. Each propulsion engine 102 is also preferentially provided with a "generator control unit" GCU, the main functions of which are to regulate and monitor the frequency and the voltage of the alternator of the IDG 103 of the propulsion engine 102 concerned, to monitor the "feeder" defects, the overloads and phase reversals, and to protect the electrical network of the aircraft 10 by controlling an associated "generator line contactor" GLC. Each GCU is connected to the avionics 101 of the aircraft 10, more particularly to an "electronic centralized aircraft monitoring" ECAM system, so as to provide alert signals if necessary, notably in the cockpit of the aircraft 10.

Each IDG 103 is conventionally equipped with two oil temperature sensors: an "inlet port" oil temperature sensor, and another, "outlet port" oil temperature sensor. These sensors are typically thermistors. Using these sensors, the GCU associated with the IDG 103 concerned monitors the temperature of the oil of the IDG 103 and supplies an alert signal if a predefined temperature threshold is exceeded on one and/or the other of these two oil temperature sensors.

Each IDG 103 is associated with a fuel return valve FRV 104 which controls the flow of fuel, used notably to cool the oil of the IDG 103, from a system for distributing fuel to the propulsion engine 102, with which the IDG 103 is associated, to a recirculation system returning hot fuel to a fuel tank of the aircraft. An aperture of the FRV makes it possible to increase the flow of fuel circulating in the fuel distribution system, this fuel being colder fuel originating from said fuel tank of the aircraft. The FRV 104 also controls said flow of fuel for the cooling of the oil of said propulsion engine 102. Thus, the oil of the IDG 103 concerned and the oil of said propulsion engine 102 are better cooled.

The aircraft 10 is equipped with an FRV 104 operating monitoring system. The FRV 104 operation monitoring system can monitor the operation of all of the FRVs 104 in a centralized manner, for example in the avionics 101. As a variant, the FRV 104 operation monitoring system can be distributed in control units (in the form of electronic circuitry) associated respectively with the propulsion engines 102.

Figure 2:
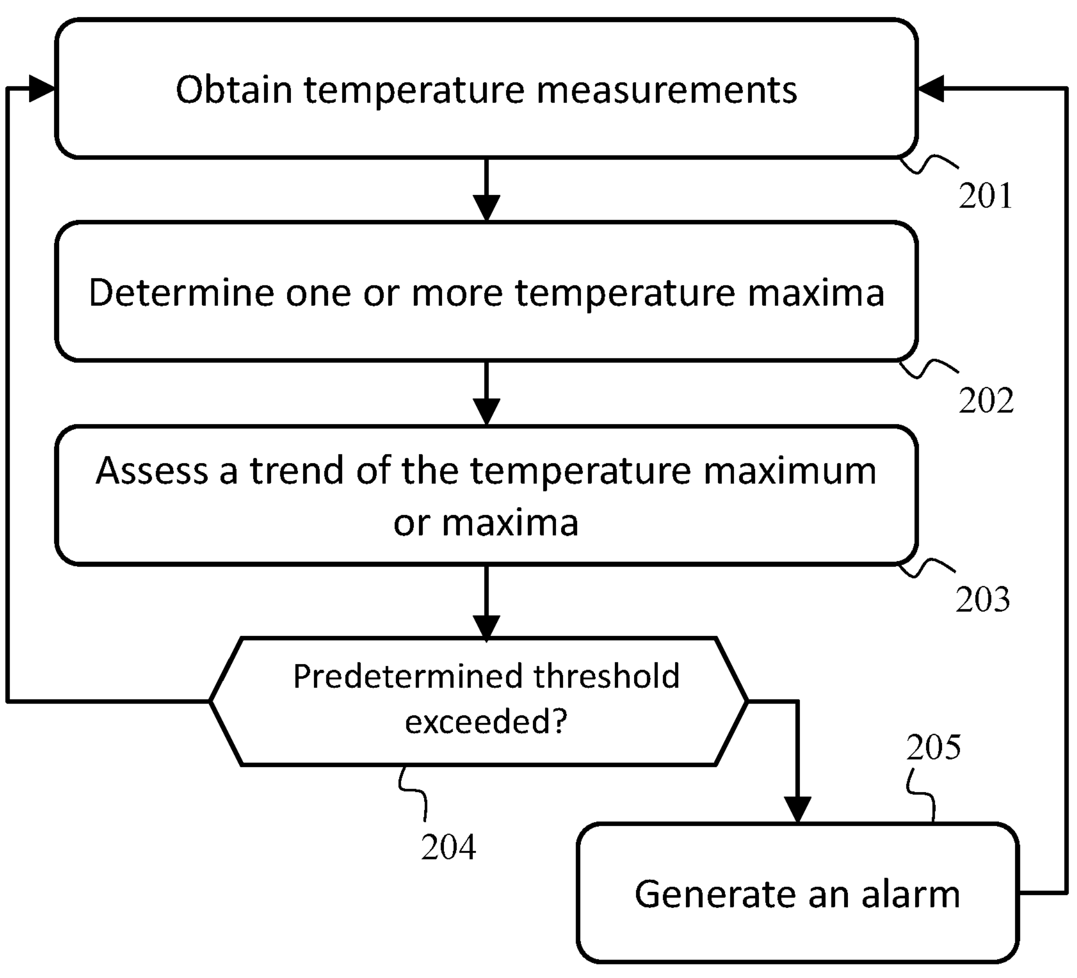
FIG. 2 schematically illustrates a monitoring algorithm.

FIG. 2 schematically illustrates an FRV 104 operation monitoring algorithm implemented by the FRV 104 operation monitoring system. The algorithm of FIG. 2 is implemented in parallel for each FRV 104 of the aircraft 10.

In a step 201, the FRV 104 operation monitoring system obtains temperature measurements originating from the oil temperature sensor at the output port of the IDG 103 with which the FRV 104 concerned is associated and/or temperature measurements originating from the sensor of the temperature of oil feeding the propulsion engine 102 with which the IDG 103 is associated.

In a step 202, the FRV 104 operation monitoring system determines an oil temperature maximum at the output port of the IDG 103 according to the measurements of the oil temperature sensor at the output port of the IDG 103 concerned and/or an oil temperature maximum of the propulsion engine 102 concerned according to the measurements of the second sensor of the oil temperature of said propulsion engine 102. Each maximum is determined for each flight of the aircraft 10. The IDG 103 oil level monitoring system records the determined maximum or maxima in non-volatile memory, in order to be able to track its or their trend thereof over several consecutive flights. For example, the trend is considered over a sliding window of said consecutive flights in which Z is equal to 5. Beyond Z flights, the IDG 103 oil level monitoring system can erase any prior recording.

Preferentially, the FRV 104 operation monitoring system takes into account only the measurements performed during the cruising flight phases of the aircraft 10. An altitude level marked by the altimeter can for example be used to detect a cruising phase. Thus, the oil level monitoring algorithm operates on an oil with an overall stabilized temperature. Also preferentially, for the same reasons, the FRV 104 operation monitoring system takes into account only the measurements performed during flights of a duration greater than a predefined duration threshold D, for example 30 minutes. An internal clock of the avionics 101 can for example be used to determine the flight times.

In a step 203, the FRV 104 operation monitoring system assesses a trend of the oil temperature maximum or maxima over several flights, for example over Z consecutive flights (sliding window).

In a step 204, the FRV 104 operation monitoring system checks whether the trend of the oil temperature maximum or maximum shows, by the temperature maximum, that a predetermined temperature threshold T has been exceeded over the sliding window. For example, T is equal to 110° C.

In a particular embodiment, the FRV 104 operation monitoring system checks whether the trend of the oil temperature maximum or maxima shows that said threshold T has been exceeded during Y flights of the sliding window of Z consecutive flights, with Y a predetermined value such that Y<Z. For example, Y is equal to 3.

Thus, if the FRV 104 operation monitoring system confirms that said threshold T has been exceeded, a step 205 is performed. Otherwise, the algorithm loops back to the step 201 for a next flight of the aircraft 10.

In the step 205, the FRV 104 operation monitoring system generates an alarm. In the aircraft 10, the alarm is preferentially generated in the cockpit, for the attention of the pilot, and more particularly, through the ECAM. Thus, by virtue of this alarm generated automatically, the maintenance of the aircraft 10 is facilitated.

The alarm can be reset, for example by a procedure dedicated to the avionics 101, where a maintenance intervention is performed on the FRV 104 concerned or on a member with which the FRV 104 interacts, directly or indirectly, such as a sensor or fuel level sensing control unit FLSCU.

Figure 3:
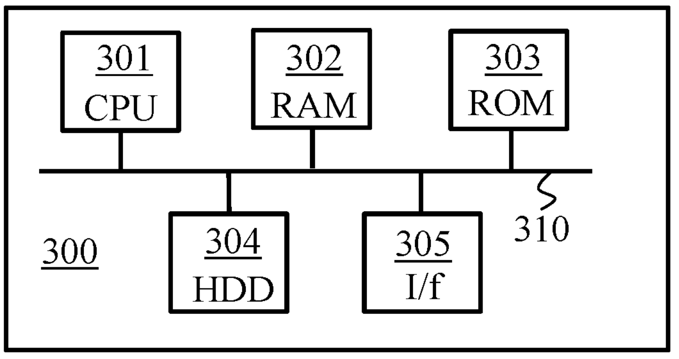
FIG. 3 schematically illustrates an example of hardware platform configured to produce an implementation of the algorithm of FIG. 2.

FIG. 3 schematically illustrates an example of a hardware platform 300 of the FRV 104 operation monitoring system, in the form of electronic circuitry, which is adapted and configured to implement the algorithm of FIG. 2. As already indicated, the FRV 104 operation monitoring system can be centralized in the avionics 101, or distributed in control units associated respectively with the propulsion engines 102.

The hardware platform 300 then comprises, linked by a communication bus 310: a processor or "central processing unit" CPU 301; a "random-access memory" RAM 302; a read-only memory 303, for example of "read-only memory" ROM or "electrically-erasable programmable ROM" EEPROM type; a storage unit 304, such as a "hard disk drive" HDD, or a storage medium reader, such as a "secure digital" SD card reader; an interface I/f manager 305.

The interface I/f manager 305 makes it possible to interact with one or more items of equipment of the aircraft 10, such as the abovementioned temperature sensors, and possibly with a communication network. For example, the interface I/f manager 305 is adapted and configured to make it possible to interact with the avionics 101.

The processor 301 is capable of executing instructions loaded into the random-access memory 302 from the read-only memory 303, from an external memory, from a storage medium (such as an SD card), or from a communication network. When the hardware platform 300 is powered up, the processor 301 is capable of reading instructions from the random-access memory 302 and of executing them. These instructions form a computer program causing the implementation, by the processor 301, of all or part of the steps and operations described here.

All or part of the steps and operations described here can thus be implemented in software form by the execution of a set of instructions by a programmable machine, for example a processor of "digital signal processor" DSP type or a microcontroller, or be implemented in hardware form by a machine or a dedicated electronic component ("chip") or a dedicated set of electronic components ("chip set"), for example a "field-programmable gate array" FPGA or "application-specific integrated circuit" ASIC. Generally, the hardware platform comprises electronic circuitry adapted and configured to implement the operations and steps described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring a fuel return valve (FRV), the FRV controlling a flow of fuel, used to cool an oil feeding a propulsion engine of an aircraft and an oil of an integrated drive generator (IDG) from a fuel distribution system to the propulsion engine to a recirculation system returning hot fuel to a fuel tank of the aircraft, an aperture of the FRV configured to increase a flow of fuel circulating in the fuel distribution system, the fuel being colder fuel originating from said fuel tank of the aircraft, a first oil temperature sensor supplying oil temperature measurements at an outlet port of the IDG, a second oil temperature sensor supplying measurements of a temperature of oil feeding the propulsion engine, the method being implemented by an FRV operation monitoring system comprising electronic circuitry, the method comprising the following steps:

receiving measurements from the first oil temperature sensor of a first oil temperature and from the second oil temperature sensor of a second oil temperature;

identifying, over a total number of flights, a sliding window of Z flights, the Z flights being a consecutive subset of the total number of flights, exceeding a duration D for monitoring the first oil temperature and the second oil temperature, the sliding window updated with each flight of the aircraft up to the total number of flights;

determining, for each flight of the aircraft, a maximum oil temperature at the outlet port of the IDG according to the measurements of said first oil temperature sensor, or a maximum oil temperature of the propulsion engine according to the measurements of said second oil temperature sensor, or according to both;

assessing a trend of the maximum oil temperature at the outlet port of the IDG, or the maximum oil temperature of the propulsion engine, or both over the Z flights;

generating an alarm flagging a malfunction experienced by the FRV, the malfunction leading to an undesirable closure of the FRV and thereby leading to an undesirable temperature rise of the oil used to cool the IDG, when the trend of the maximum oil temperature shows that a predetermined oil temperature threshold (T) has been exceeded during Y flights of the sliding window of Z flights, with Y and Z predetermined values such that Y<Z.

2. The method according to claim 1, wherein only the measurements received during cruising flight phases of the aircraft are taken into account for assessing the trend.

3. The method according to claim 1, wherein, to monitor several FRV respectively associated with several propulsion engines of the aircraft, the FRV operation monitoring system comprises control units respectively associated with the propulsion engines of the aircraft.

4. The method according to claim 1, wherein the FRV operation monitoring system is in an avionics of the aircraft.

5. A non-transitory computer storage medium comprising:
a computer program comprising instructions, which, when executed by a processor, perform the method according to claim 1.

6. The method according to claim 1, further including:
erasing trend data, when the sliding window of Z flights is updated, corresponding to flights preceding the updated sliding window.

7. The method according to claim 1, wherein the duration D is greater than thirty minutes.

8. A system for monitoring operation of a fuel return valve (FRV), the FRV controlling a flow of fuel used to cool an oil feeding a propulsion engine of an aircraft and an oil of an integrated drive generator (IDG) from a system for distributing fuel to the propulsion engine to a recirculation system returning hot fuel to a fuel tank of the aircraft, an aperture of the FRV configured to increase the flow of fuel circulating in the fuel distribution system, the fuel being colder fuel originating from said fuel tank of the aircraft, the system comprising:
a first oil temperature sensor configured to supply oil temperature measurements at an output port of the IDG, a second oil temperature sensor configured to supply measurements of a temperature of oil feeding the propulsion engine,
an electronic circuitry configured to implement the following steps:
receiving measurements from the first oil temperature sensor of a first oil temperature and from the second oil temperature sensor of a second oil temperature;
identifying, over a total number of flights, a sliding window of Z flights, the Z flights being a consecutive subset of the total number of flights, exceeding a duration D for monitoring the first oil temperature and the second oil temperature, the sliding window updated with each flight of the aircraft up to the total number of flights;
determining, for each flight of the aircraft, a maximum oil temperature at the output port of the IDG according to the measurements of said first oil temperature sensor, a maximum oil temperature of the propulsion engine according to the measurements of said second oil temperature sensor, or both;
assessing a trend of the maximum oil temperature at the output port of the IDG, or the maximum oil temperature of the propulsion engine, or both over the Z flights;
generating an alarm flagging a malfunction experienced by the FRV, the malfunction leading to an undesirable closure of the FRV and thereby leading to an undesirable temperature rise of the oil used to cool the IDG, when the trend of the maximum oil temperature shows that a predetermined oil temperature threshold (T) has been exceeded during Y flights of the sliding window of Z flights, with Y and Z predetermined values such that $Y<Z$.

9. An aircraft comprising:
at least one FRV operation monitoring system according to claim 8.

10. The FRV operation monitoring system according to claim 8, wherein the electronic circuitry is further configured to:
erase trend data, when the sliding window of Z flights is updated, corresponding to flights preceding the updated sliding window.

11. The FRV operation monitoring system according to claim 8, wherein the duration D is greater than thirty minutes.

* * * * *